AUTOMATIC GAIN CONTROL CIRCUIT

Filed Nov. 1, 1960

INVENTORS.
GEORGE V. LENNON III
HERMANN LINS JR.
BY
T. L. Stynes
ATTORNEY

United States Patent Office 3,098,195
Patented July 16, 1963

3,098,195

AUTOMATIC GAIN CONTROL CIRCUIT

George V. Lennon III and Hermann Lins, Jr., Rochester, N.Y., assignors to General Dynamics Corporation, Rochester, N.Y., a corporation of Delaware Filed Nov. 1, 1960, Ser. No. 66,532
5 Claims. (Cl. 323—79)

This invention relates to automatic gain control circuits and is directed particularly to means for simplifying the control circuits and for reducing the distortions of the signals attending the operation of the control circuits.

Two circuits are generally employed in compressing the range of amplitudes of signals in a transmission circuit, the most common comprising means to derive a biasing voltage proportional to the average energy level of the signal and means to feed back this biasing voltage to RF or IF amplifiers to appropriately change the overall gain of the amplifiers in the transmission circuit. Considerable distortion usually results in the biased amplifiers, because the control electrodes must be biased over a wide range, and because the linear portions of the amplifier characteristics are quite limited. Such circuits, further, are quite complex. The second method of compressing amplitude ranges comprises the well known clipping circuits. Clipping circuits usually limit amplitude levels by imposing a fixed voltage ceiling above which the signal voltage cannot rise. To deliberately clip or "chop off" signal peaks, of course, inherently distorts the signal.

An object of this invention is to provide an improved automatic gain control circuit.

A more specific object of this invention is to provide an automatic gain control circuit which is simple in construction, reliable in operation, and free of signal distortion.

The objects of this invention are attained by connecting a varistor in shunt to the transmission circuit and varying a biasing direct current through the varistor in accordance with the average signal level. The transmission circuit including the variable shunting resistance is free of reactance components at all signal levels and is free of distortion.

Other objects and features of this invention will become apparent to those skilled in the art by referring to the specific embodiments described in the following specification and shown in the accompanying drawing in which.

Figure 1:
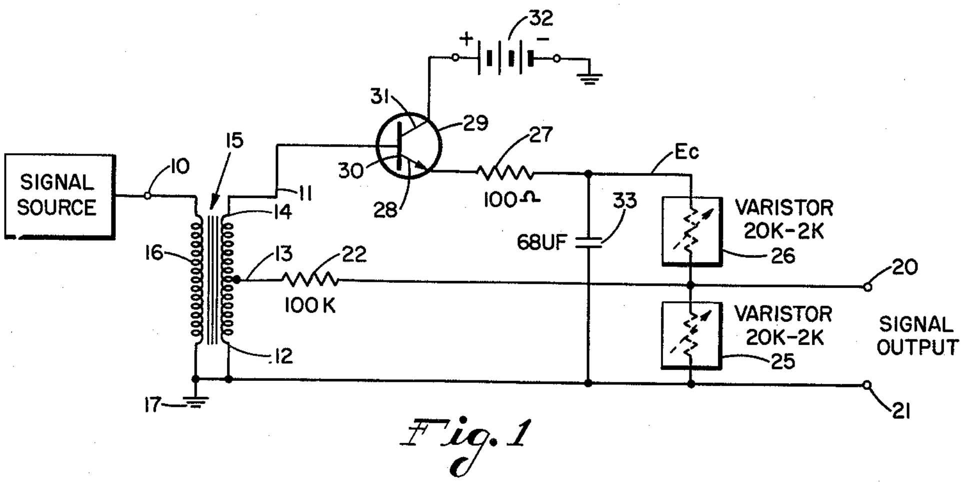
FIG. 1 shows a preferred embodiment of the automatic gain control circuit of this invention.

In FIG. 1, it is contemplated that the input terminal 10 may be connected to a signal source of any waveform of high or low frequency, and of audio or carrier frequency. In the specific examples discussed below, audio signals will be referred to. For the purposes of this invention, it is preferred that the signal be made available at the terminals 11 and 12 and at the intermediate tap 13 of the secondary winding 14 of the transformer 15. One terminal of the primary winding 16 of the transformer is connected to the input terminal 10, while the other terminal is referred to ground 17. Where the signal frequency is low or in the audio range, the transformer should have an iron core, as shown. According to this invention, the output terminals 20 and 21 of the AGC system are coupled between the intermediate tap 13 and the grounded end 12 of the secondary winding. In series with this output circuit is connected resistor 22 which, as will appear hereinafter, is relatively high in ohmic value compared to other resistances in shunt with the circuit. In shunt across the output circuit is connected varistor 25.

Figure 2:
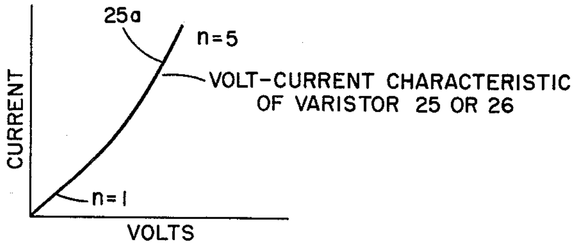
FIG. 2 shows the voltage-current characteristic of the varistors employed in the circuit of FIG. 1.

Varistor 25 is a resistance, the value of which changes with current through or voltage across the resistance. That is, the resistance of the varistor 25 is not fixed and the relationship of direct current, I, in amperes through the resistance to direct current voltage, E, across the resistance may be defined as:

$$I = KE^n$$

where K and $n$ are constants. The exponent $n$ in this equation is the reciprocal of the slope of the voltage-current curve as shown at 25*a* in FIG. 2. In most commercially available varistors, $n$ may equal 1 at low voltages and low current, and the slope of the characteristic may increase so that $n=5$ or 6 or more at high voltage and current. One varistor 25 employed in an automatic gain control circuit of the type shown in FIG. 1 and used in a microphone circuit was of the type commercially known as the "Thyrite" varistor obtainable from the General Electric Company in Schenectady, New York, and identified by the General Electric Catalog No. 8396839G1. This particular varistor has a resistance value of 20,000 ohms with no current flowing and a resistance value of 2,000 ohms when a bias current of one milliampere is flowing.

Figure 3:
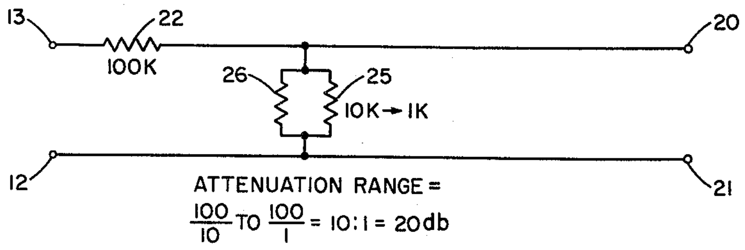
FIG. 3 shows a simplified circuit equivalent to the circuit of FIG. 1.

The circuit for controlling the bias current through varistor 25 in accordance with signal strength comprises the second varistor 26 connected as shown in series with varistor 25, the two series varistors being coupled through amplifier 29 between the end terminals 11 and 12 of winding 14. The junction of the two varistors is then common with the output terminal 20. Since the signal voltages at terminal 11 and tap 13 are in phase with respect to terminal 12, the signal voltages arriving at output terminal 20 via resistor 22 and varistor 26 are in phase, and the two varistors are effectively in parallel with respect to the signal circuit. The equivalent signal circuit may be simplified, as shown in FIG. 3, with the resistor 22 in series with the signal circuit and with the varistors 25 and 26 in parallel with each other and in shunt to the signal circuit. The output signal voltage between terminals 20 and 21, now, is determined by the ratio of series and shunt resistances. While the varistors are in parallel as far as the signal circuit is concerned, the varistors are in series as far as the direct current biasing circuit is concerned.

The direct current biasing circuit contemplated produces a direct current voltage which is proportional to the input signal strength and which is applied to the series-connected varistors. The biasing circuit comprises a peak detector including the transistor 29 of FIG. 1. The transistor charges the relatively large storage condenser 33, through current limiting resistor 27, to near the peak voltage of the signal. When polarized as shown, the upper terminal of storage condenser 33 charges to a positive potential. The energy for charging condenser 33 is supplied by battery source 32, the charge being controlled by the signal source which is connected, in the particular configuration shown, to the base 30 of the transistor. The transistor 29, shown, is of the N-P-N type, and the collector-emitter impedance is small or large depending upon the relative potential of the base with respect to the other electrodes. The back resistance of the emitter circuit is high and the forward resistance is low, as in diodes; and the diode comprising the base-collector is operative to charge the condenser and to isolate the condenser, switch fashion, in response to the signals applied to the base. Accordingly, the rise time of the generated D.C. voltage, $E_c$, across the condenser is short, while the decay time is quite long, as in peak riding detectors.

The winding ratios of the transformer 15 were so selected in one embodiment employing the "Thyrite" varistors mentioned above that at a maximum audio signal input voltage enough audio voltage was developed in the transistor to create six volts across the series varistors. At this voltage, the biasing current through the varistors of the type mentioned was sufficient to reduce the resistance of each varistor to its minimum value of 2,000 ohms. The parallel equivalent audio load, comprising the net resistance of 1,000 ohms of the varistors 25 and 26 across the signal path and the resistance of 100,000 ohms in series with the signal path as shown in FIG. 3, divides the available signal voltage in the ratio 100:1 and results in an attenuation of 40 db. As the input signal is reduced from the mentioned maximum value by 20 db, the direct current voltage $E_c$ applied to the varistors is reduced to approximately zero volts, in which case the resistances of each varistor returns to its full 20,000 ohms. The two 20,000-ohm resistances in parallel presents 10,000 ohms in shunt to the signal path. Under this condition, the voltage division is now 100:10 and the circuit insertion loss becomes 20 db, hence the output remains substantially constant in spite of the 20 db change in input level. It will be noted that resistive components only are employed in producing this wide range of attenuation, that there is no phase shift, and that signal distortion is zero or extremely low.

As stated, with the rectifying action of transistor 29, the charge time of the condenser may be quite short and decay time quite long. Condenser 33, in the embodiment mentioned, was 68 microfarads and had a rise time of less than one millisecond, while the decay time of the condenser was approximately 800 milliseconds. The peak-to-average speech power ratio is faithfully preserved.

The automatic gain control circuits of this invention are simple in construction, reliable in operation, and remarkably free of distortion while dynamically controlling attenuation of an output signal to within narrow limits while the input signal varies throughout wide limits.

What is claimed is:

1. An automatic signal gain control circuit comprising a transformer with primary and secondary windings, a signal source coupled to said primary winding, a varistor with a non-linear voltage-current characteristic, a fixed resistor, said varistor and said resistor being connected in series across a portion of said secondary winding, an output terminal connected to the junction of said resistor and said varistor, a direct current source coupled across said varistor, an amplifier with a controlling circuit and a controlled circuit, said controlled circuit being connected in circuit between said direct current source and said varistor, said controlling circuit of said amplifier being connected to said secondary winding for regulating the current through said varistor in accordance with the signal voltage of said signal source.

2. An automatic signal attenuation control circuit comprising a signal source, a pad consisting of a resistor and a varistor connected in series between points of signal voltage difference in said signal source, an output circuit coupled across said varistor, means for changing the resistance of said varistor in response to changes in signal level of said source, said means including a direct current source and an amplifier, with a controlled circuit, connected in series across said varistor, the controlling electrode of said amplifier being connected to said signal source.

3. An automatic gain control circuit comprising a transformer with a primary winding and a secondary winding, the primary winding having terminals which may be connected to a signal source of voltage which may vary between wide limits, the secondary winding of said transformer having end terminals and a tap at an intermediate point, two varistors connected in series between said end terminals, the junction of said varistors being coupled to said intermediate tap and to an output terminal, the coupling to said intermediate tap including a series resistance of ohmic value which is relatively high compared to the resistance of said varistors, means for biasing said varistors in accordance with an average signal level to hold the output level at said output terminal relatively steady as the input signal level varies relatively widely, said means including a condenser across said series connected varistors, and a rectifier connected between one terminal of said secondary winding and one terminal of said condenser.

4. An automatic gain control circuit comprising a signal source, a transmission line coupled between said source and output terminals, a first varistor with a non-linear voltage current characteristic connected in shunt across said line, a fixed resistor connected in series with said line, a second varistor connected in series with said first varistor, a peak-riding detector connected between said signal source and said series connected varistors for non-linearly varying the biasing current through said series varistors in response to the signal level of said signal source.

5. An automatic gain control circuit comprising a signal source, a transmission line coupled between said source and output terminals, a first varistor with a non-linear voltage current characteristic connected in shunt across said line, a fixed resistor connected in series with said line, a fixed resistor connected in series with said line, a second varistor connected in series with said first varistor, a peak-riding detector connected between said signal source and said series connected varistors, said peak-riding detector comprising a voltage source and a transistor with base, collector and emitter electrodes, two of said electrodes being connected between said voltage source and one end of said series connected varistors, the third electrode being connected to said signal source for controlling the current from said direct current source through said varistors, and a storage condenser, said condenser being connected across said series connected varistors.

References Cited in the file of this patent

UNITED STATES PATENTS 2,086,910 Hansell ---------------- July 13, 1937

FOREIGN PATENTS 1,181,706 France ---------------- June 18, 1959